United States Patent
Shin et al.

(10) Patent No.: US 12,382,410 B2
(45) Date of Patent: *Aug. 5, 2025

(54) METHOD AND APPARATUS FOR PERFORMING COMMUNICATION IN WIRELESS COMMUNICATION SYSTEM

(71) Applicant: LG Electronics Inc., Seoul (KR)

(72) Inventors: Seokmin Shin, Seoul (KR); Haewook Park, Seoul (KR); Kijun Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 315 days.

This patent is subject to a terminal disclaimer.

(21) Appl. No.: 17/713,816

(22) Filed: Apr. 5, 2022

(65) Prior Publication Data

US 2022/0330191 A1    Oct. 13, 2022

(30) Foreign Application Priority Data

Apr. 5, 2021   (KR) .................. 10-2021-0044236
Aug. 5, 2021   (KR) .................. 10-2021-0103409
Aug. 26, 2021  (KR) .................. 10-2021-0113480

(51) Int. Cl.
*H04W 56/00* (2009.01)
*G01S 19/25* (2010.01)
*H04W 84/06* (2009.01)

(52) U.S. Cl.
CPC ....... *H04W 56/0045* (2013.01); *G01S 19/256* (2013.01); *G01S 19/258* (2013.01); *H04W 84/06* (2013.01)

(58) Field of Classification Search
CPC ............. H04W 56/0045; H04W 84/06; H04W 56/0005; H04W 56/0065; H04W 72/231; G01S 19/256; G01S 19/258; H04B 7/1855

See application file for complete search history.

(56) References Cited

U.S. PATENT DOCUMENTS

2021/0273719 A1*  9/2021  Wang .............. H04B 7/18519
2022/0046679 A1*  2/2022  Yeo ................. H04L 1/1896
(Continued)

FOREIGN PATENT DOCUMENTS

WO    WO2020034576    2/2020

OTHER PUBLICATIONS

International Search Repot in International Appln. No. PCT/KR2022/003915, dated Jun. 27, 2022, 3 pages.
(Continued)

*Primary Examiner* — Shah M Rahman
(74) *Attorney, Agent, or Firm* — Fish & Richardson P.C.

(57) ABSTRACT

Methods and apparatuses for performing communication in a wireless communication system. A user equipment (UE) receives first satellite ephemeris information related to a first satellite and information related to a first validity duration corresponding to the first satellite from a base station; and restarts a first validity timer, based on second satellite ephemeris information related to the first satellite being received from the base station while the first validity timer having the first validity duration is running. The UE obtains a first TA for the first satellite based on the first satellite ephemeris information before the first validity timer restarts, expires, or stops after starting based on the first validity duration, and the UE obtains a second TA for the first satellite based on the second satellite ephemeris information before the first validity timer expires or stops after restarting based on a second validity duration.

14 Claims, 13 Drawing Sheets

(56) References Cited

U.S. PATENT DOCUMENTS

| | | | | |
|---|---|---|---|---|
| 2022/0086671 | A1* | 3/2022 | Hong | H04W 16/28 |
| 2022/0086715 | A1* | 3/2022 | Hong | H04W 36/249 |
| 2022/0086786 | A1* | 3/2022 | Narasimha | H04W 56/0005 |
| 2022/0232503 | A1* | 7/2022 | Cheng | H04W 56/009 |
| 2022/0408389 | A1* | 12/2022 | Wang | H04W 56/005 |
| 2023/0092925 | A1* | 3/2023 | Wang | H04B 7/18547 |
| | | | | 455/456.1 |
| 2023/0116580 | A1* | 4/2023 | Cheng | H04W 56/0035 |
| | | | | 370/329 |
| 2023/0189088 | A1* | 6/2023 | Shin | H04B 7/18513 |
| | | | | 455/427 |
| 2023/0308172 | A1* | 9/2023 | Lin | H04B 7/18519 |
| 2023/0337165 | A1* | 10/2023 | Hu | H04W 72/1263 |
| 2024/0031972 | A1* | 1/2024 | Kuang | H04W 60/04 |
| 2024/0063894 | A1* | 2/2024 | Vogedes | H04B 7/18541 |
| 2024/0064583 | A1* | 2/2024 | Maattanen | H04W 36/0072 |
| 2024/0137885 | A1* | 4/2024 | Yuan | H04W 56/0045 |

OTHER PUBLICATIONS

LG Electronics, "Discussions on UL time and frequency synchronization enhancements in NTN," R1-2100704, 3GPP TSG RAN WG1 #104-e, e-Meeting, Jan. 25-Feb. 5, 2021, 8 pages.

MediaTek & Eutelsat, "UE Time and frequency Synchronisation for NR-NTN," R1-2100595, Presented at 3GPP TSG RAN WG1 Meeting #104e, Jan. 25-Feb. 5, 2021, 17 pages.

Thales & Rakuten mobile, "Considerations on UL timing and frequency synchronization in NTN," R1-2100520, Presented at 3GPP TSG RAN WG1 Meeting #104-e, e-Meeting, Jan. 25-Feb. 5, 2021, 25 pages.

Thales, "FL Summary on enhancements on UL time and frequency synchronization for NR NTN," R1-2102182, Presented at P3GPP TSG-RAN WG1 Meeting #104-e, e-Meeting, Jan. 25-Feb. 5, 2021, 85 pages.

* cited by examiner

- Common TA(Tcom) = 2*Do/c
- UE specific differential TA for xth UE (TUEx) = 2*(Dtx-Do)/c
- Full TA(Tfull) = Tcom + TUEx Regenerative payload

- Common TA(Tcom) = 2*(Do1+Do2)/c
- UE specific differential TA for xth UE (TUEx) = 2*(Dtx-Do1)/c
- Full TA(Tfull) = Tcom + TUEx Transparent payload

METHOD AND APPARATUS FOR PERFORMING COMMUNICATION IN WIRELESS COMMUNICATION SYSTEM

CROSS-REFERENCE TO RELATED APPLICATIONS

This application claims the benefit of an earlier filing date and right of priority to Korean Application No. 10-2021-0044236, filed on Apr. 5, 2021, Korean Application No. 10-2021-0103409, filed on Aug. 5, 2021, and Korean Application No. 10-2021-0113480, filed on Aug. 26, 2021, the contents of which are all hereby incorporated by reference herein in their entirety.

TECHNICAL FIELD

The present disclosure relates to a wireless communication system, and more particularly, to a method and an apparatus for performing communication in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for performing communication in a wireless communication system.

In addition, an additional technical object of the present disclosure is to provide a method and apparatus for obtaining UE-specific timing advance (TA) based on satellite ephemeris information in a non-terrestrial network system.

In addition, an additional technical object of the present disclosure is to provide a method and an apparatus for configuring a validity duration for satellite ephemeris information for obtaining UE-specific TA.

The technical objects to be achieved by the present disclosure are not limited to the above-described technical objects, and other technical objects which are not described herein will be clearly understood by those skilled in the pertinent art from the following description.

According to embodiment of the present disclosure, a method of performing communication by a user equipment (UE) in a wireless communication system may include receiving first satellite ephemeris information related to a first satellite and information related to a first validity duration corresponding to the first satellite from a base station; and restarting a first validity timer, based on second satellite ephemeris information related to the first satellite being received from the base station while the first validity timer having the first validity duration is running, and the UE obtains a first timing advance (TA) for the first satellite based on the first satellite ephemeris information before the first validity timer restarts, expires, or stops after starting based on the first validity duration, and the UE obtains a second TA for the first satellite based on the second satellite ephemeris information before the first validity timer expires or stops after restarting based on a second validity duration.

According to embodiment of the present disclosure, a method of performing communication by a base station in a wireless communication system may include transmitting, to a user equipment (UE), first satellite ephemeris information related to a first satellite and information related to a first validity duration corresponding to the first satellite; and transmitting, to the UE, second satellite ephemeris information related to the first satellite while a first validity timer having the first validity duration is running, and the UE obtains a first timing advance (TA) for the first satellite based on the first satellite ephemeris information before the first validity timer restarts, expires, or stops after starting based on the first validity duration, and the UE restarts the first validity timer based on the second satellite ephemeris information being received, and the UE obtains a second TA for the first satellite based on the second satellite ephemeris information before the first validity timer expires or stops after restarting based on a second validity duration.

According to an embodiment of the present disclosure, a method and an apparatus for performing communication may be provided in a wireless communication system.

According to an embodiment of the present disclosure, a method and apparatus for obtaining UE-specific timing advance (TA) based on satellite ephemeris information may be provided in a non-terrestrial network system.

According to an embodiment of the present disclosure, a method and an apparatus for configuring a validity duration for satellite ephemeris information for obtaining UE-specific TA may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
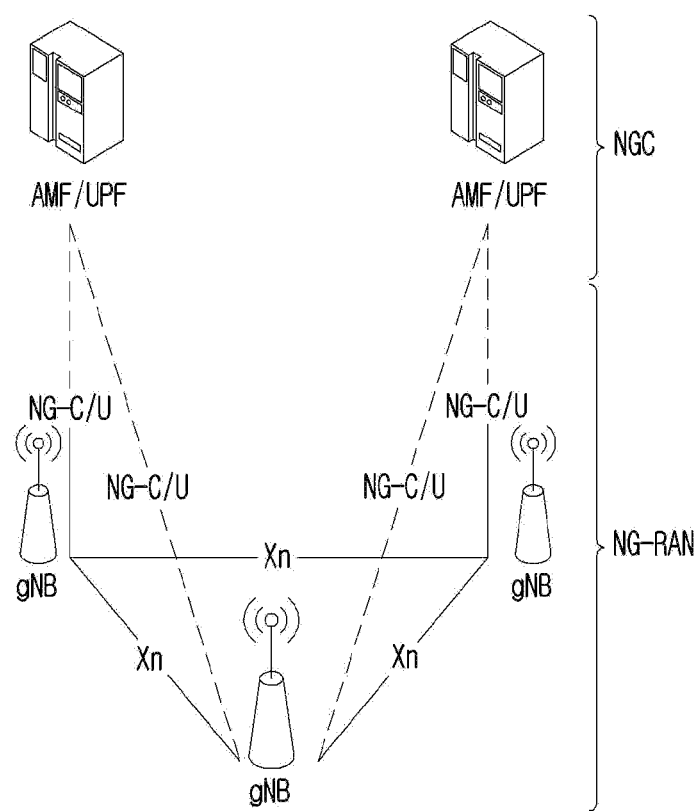
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB(evolved-NodeB), a gNB(Next Generation NodeB), a BTS(base transceiver system), an Access Point(AP), a Network(5G network), an AI(Artificial Intelligence) system/module, an RSU(road side unit), a robot, a drone(UAV: Unmanned Aerial Vehicle), an AR(Augmented Reality) device, a VR(Virtual Reality) device, etc. In addition, a terminal may be fixed or mobile, and may be substituted with a term such as a UE(User Equipment), an MS(Mobile Station), a UT(user terminal), an MSS(Mobile Subscriber Station), an SS(Subscriber Station), an AMS(Advanced Mobile Station), a WT(Wireless terminal), an MTC(Machine-Type Communication) device, an M2M(Machine-to-Machine) device, a D2D(Device-to-Device) device, a vehicle, an RSU(road side unit), a robot, an AI(Artificial Intelligence) module, a drone(UAV: Unmanned Aerial Vehicle), an AR(Augmented Reality) device, a VR(Virtual Reality) device, etc.

The following description may be used for a variety of radio access systems such as CDMA, FDMA, TDMA, OFDMA, SC-FDMA, etc. CDMA may be implemented by a wireless technology such as UTRA(Universal Terrestrial Radio Access) or CDMA2000. TDMA may be implemented by a radio technology such as GSM(Global System for Mobile communications)/GPRS(General Packet Radio Service)/EDGE(Enhanced Data Rates for GSM Evolution). OFDMA may be implemented by a radio technology such as IEEE 802.11(Wi-Fi), IEEE 802.16(WiMAX), IEEE 802-20, E-UTRA(Evolved UTRA), etc. UTRA is a part of a UMTS (Universal Mobile Telecommunications System). 3GPP(3rd Generation Partnership Project) LTE(Long Term Evolution) is a part of an E-UMTS(Evolved UMTS) using E-UTRA and LTE-A(Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS(Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211(physical channels and modulation), TS 36.212(multiplexing and channel coding), TS 36.213(physical layer procedures), TS 36.300(overall description), TS 36.331(radio resource control) may be referred to.

For 3GPP NR, TS 38.211(physical channels and modulation), TS 38.212(multiplexing and channel coding), TS 38.213(physical layer procedures for control), TS 38.214 (physical layer procedures for data), TS 38.300(NR and NG-RAN(New Generation-Radio Access Network) overall description), TS 38.331(radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB(enhanced mobile broadband communication), mMTC(massive MTC), URLLC(Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA(NG-Radio Access) user plane (i.e., a new AS(access stratum) sublayer/PDCP(Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF(Access and Mobility Management Function) through an N2 interface, and is connected to a UPF(User Plane Function) through an N3 interface.

Figure 2:
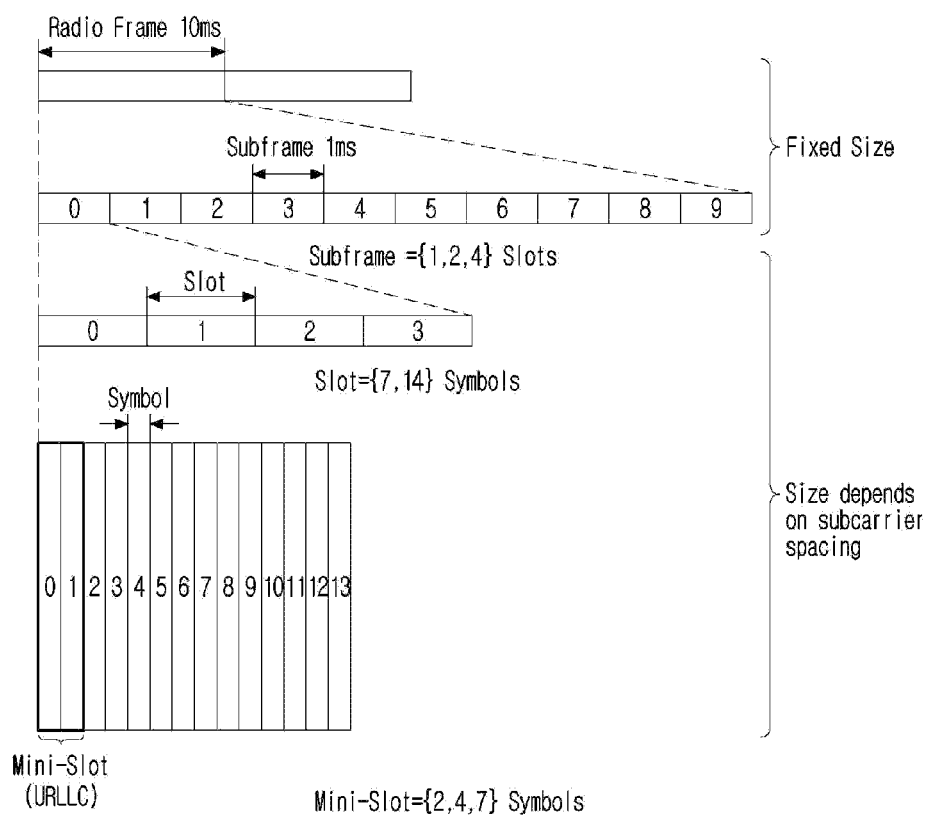
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, µ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf=$2^\mu$·15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410MHz-7125MHz | 15,30,60kHz |
| FR2 | 24250MHz-52600MHz | 60,120,240kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{subframe,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |

TABLE 3-continued

| | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |

TABLE 4

| | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL(quasi co-located or quasi co-location) relationship. In this case, the large-scale property includes at least one of delay spread, doppler spread, frequency shift, average received power, received timing.

Figure 3:
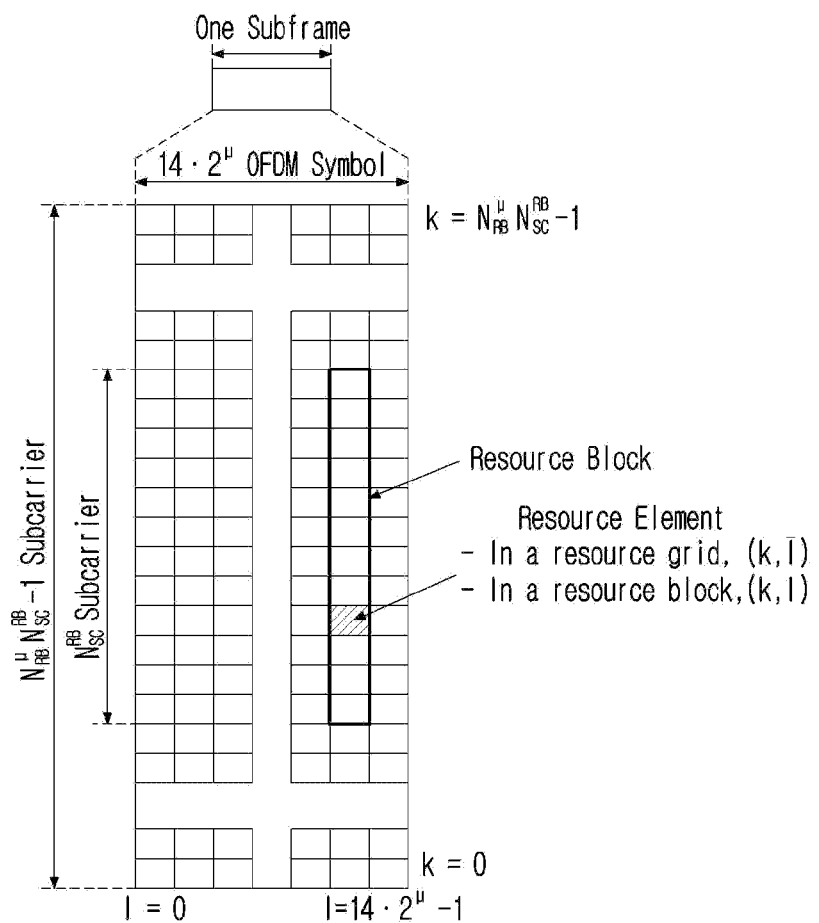
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu$Nsymb$^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^\mu N_{sc}^{RB}$-1 is an index in a frequency domain and 1'=0, . . . , $2^\mu$Nsymb$^{(\mu)}$-1 refers to a position of a symbol in a subframe. When referring to a resource element in a slot, an index pair (k,l) is used. Here, l=0, . . . , Nsymb$^\mu$-1. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
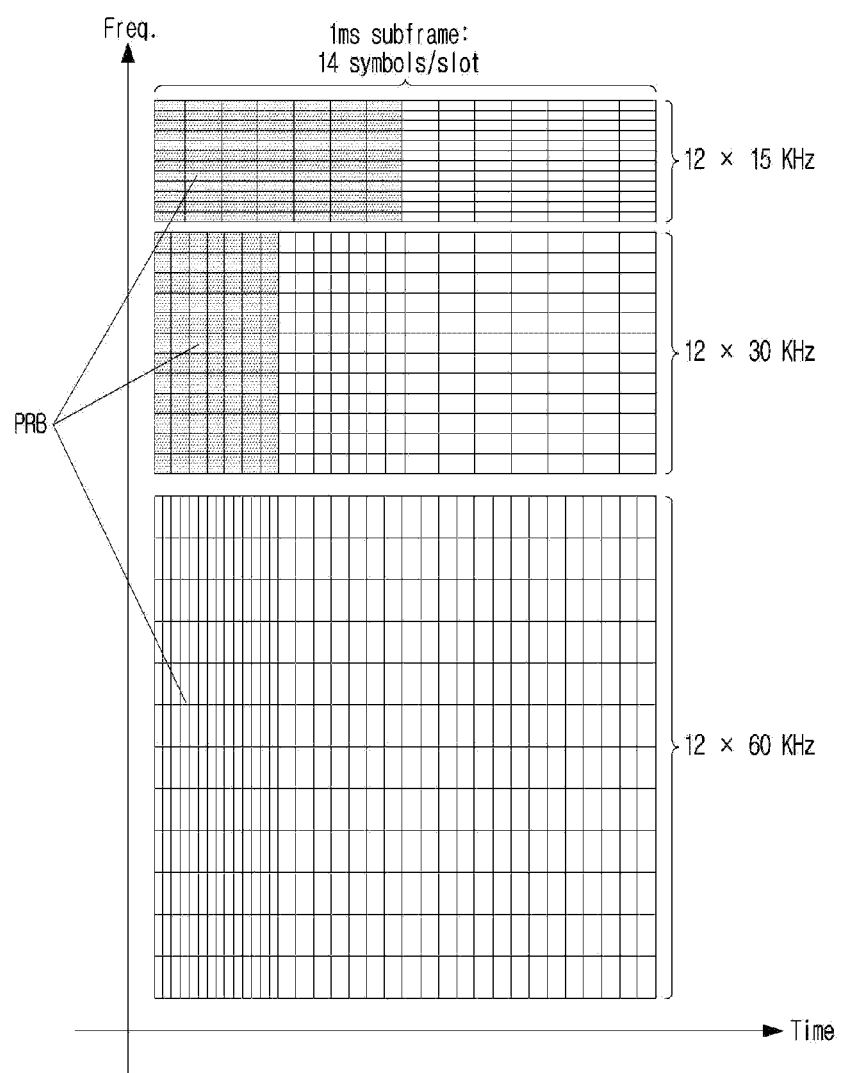
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
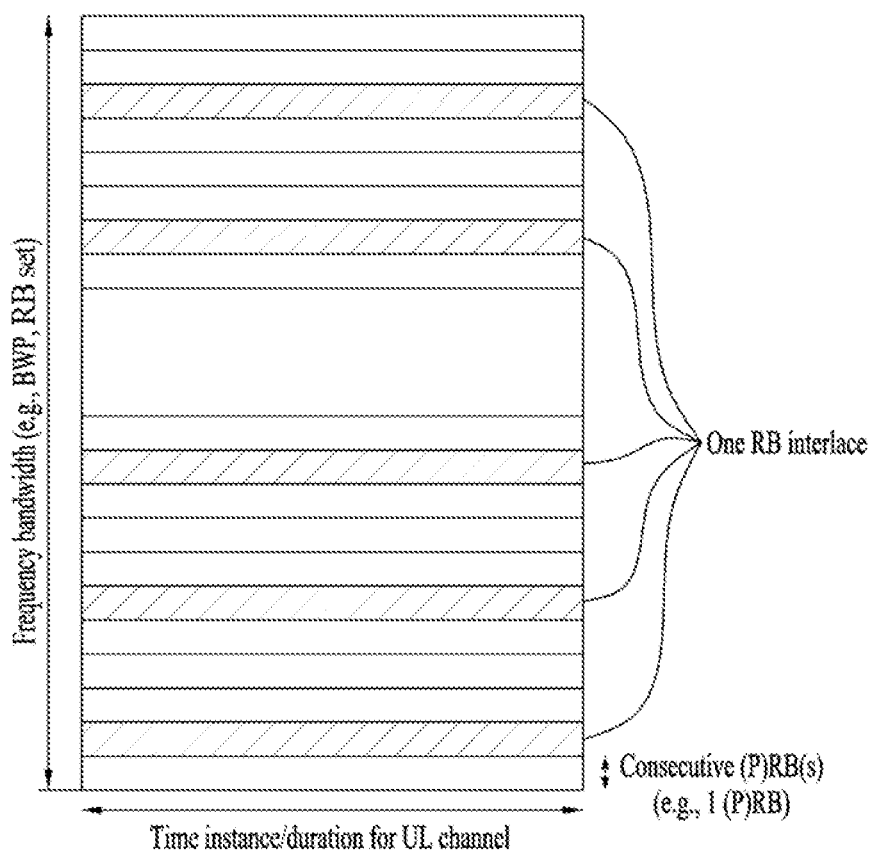
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP(Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE(Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
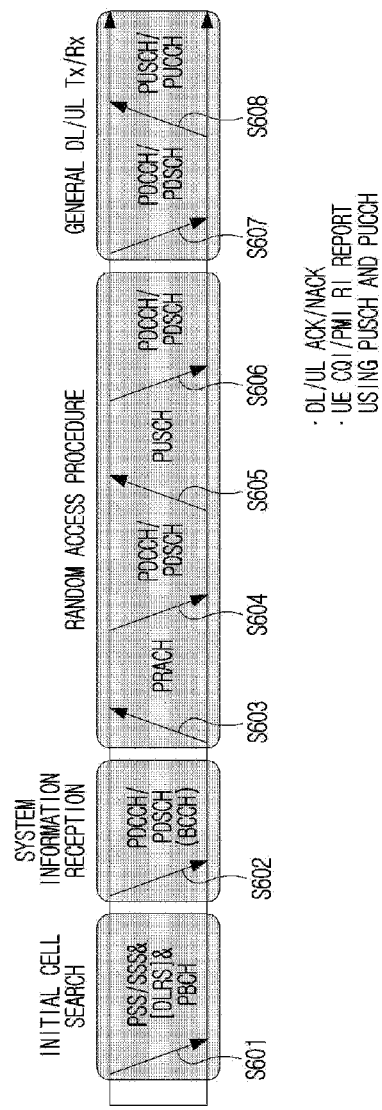
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH(Physical Uplink Shared Channel)/PUCCH(physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK(Acknowledgement/Non-Acknowledgement) signal, a CQI(Channel Quality Indicator), a PMI(Precoding Matrix Indicator), a RI(Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL(Supplementary UL), frequency resource allocation, time resource allocation, frequency hopping, etc.), information related to a transport block (TB) (e.g., MCS(Modulation Coding and Scheme), a NDI(New Data Indicator), a RV(Redundancy Version), etc.), information related to a HARQ(Hybrid-Automatic Repeat and request) (e.g., a process number, a DAI(Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI(Cell Radio Network Temporary Identifier) or a CS-RNTI(Configured Scheduling RNTI) or a MCS-C-RNTI(Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI(Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB(virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI(transmission configuration indicator), a SRS(sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

A Wireless Communication System Supporting a Non-Terrestrial Network (NTN)

NTN refers to a network or a segment of a network configured to use a radio resource (RF resource) in a satellite or unmanned aircraft system (UAS) platform. In order to secure wider coverage or to provide a wireless communication service in a place where it is not easy to install a wireless communication base station, the use of the NTN service is being considered.

Here, the NTN service refers to providing a wireless communication service to UEs by installing a base station on an artificial satellite(e.g., geostationary-orbit, low-orbit, medium-orbit satellite, etc.), an airplane, an unmanned aerial vehicle, a drone, etc. rather than on the ground. In the following description, the NTN service may include an NR NTN service and/or an LTE NTN service. A terrestrial network (TN) service refers to providing a wireless communication service to UEs by installing a base station on the ground.

A frequency band considered for the NTN service may be a 2 GHz band (S-band: 2-4 GHz) in the frequency range 1 (FR1)(e.g., 410 MHz to 7.125 GHz), and a downlink 20 GHz and uplink 30 GHz band (Ka-Band: 26.5~40 GHz) in the frequency range 2(FR2). Additionally, the NTN service may be supported in a frequency band between 7.125 GHz and 24.25 GHz or in a frequency band of 52.6 GHz or higher.

Figure 7A:
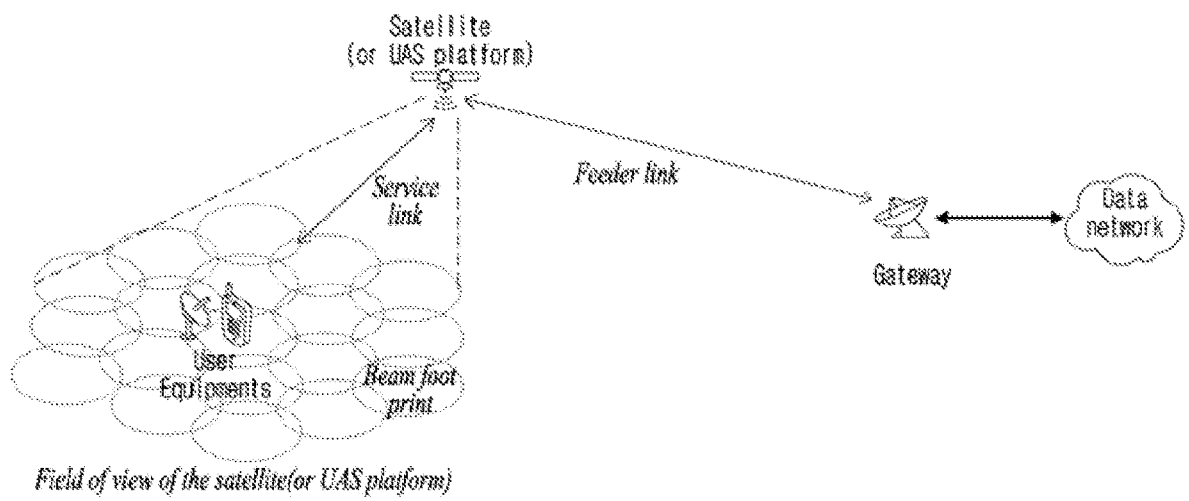
FIG. 7A to FIG. 8B are diagrams for describing non-terrestrial network (NTN) supported by a wireless communication system to which the present disclosure may be applied.
Figure 7B:
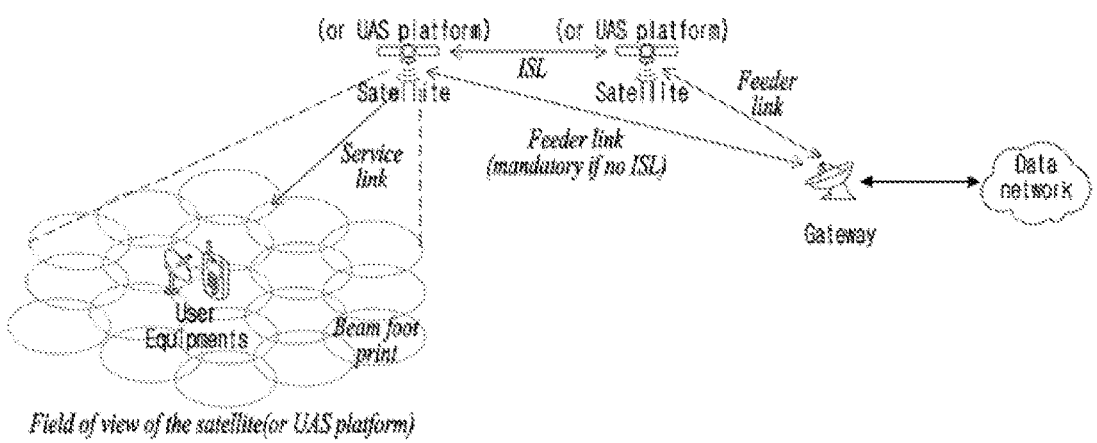

FIGS. 7A and 7B are diagrams for describing NTN supported by a wireless communication system to which the present disclosure may be applied.

FIG. 7A illustrates an NTN scenario based on a transparent payload (transparent payload) and FIG. 7B illustrates an NTN scenario based on a regenerative payload (regenerative payload).

Here, the NTN scenario based on the transparent payload is a scenario in which an artificial satellite that has received a payload from a terrestrial base station transmits the corresponding payload to the UE, and the NTN scenario based on the regenerative payload refers to a scenario in which an artificial satellite is implemented as a base station (gNB).

NTNs are typically characterized by the following elements:
  one or more satellite-gateways for connecting NTN to public data networks:
  A geostationary earth orbiting (GEO) satellite is fed by one or more satellite-gateways that are deployed in coverage targeted by the satellite (e.g., regional or continental coverage). A UE in a cell may be assumed to be served by only one satellite-gateway.

Non-GEO satellites may be successively served by one or more satellite-gateways. At this time, the wireless communication system guarantees service and feeder link continuity between the serving satellite-gateways for a time period sufficient to proceed with mobility anchoring and hand-over.

A feeder link or radio link between the satellite-gateway and the satellite (or UAS platform)

Service link or radio link between the UE and the satellite (or UAS platform)

A satellite (or UAS platform) capable of implementing either a transparent or a regenerated (including on-board processing) payload.

Satellite (or UAS platform) generated beams generally generate a plurality of beams in a service area bounded by the field of view of the satellite (or UAS platform). The footprint of the beam is generally elliptical. The view of the satellite (or UAS platform) is determined by the onboard antenna diagram and the minimum elevation angle.

Transparent Payload: radio frequency filtering, frequency conversion and amplification. Accordingly, the waveform signal repeated by the payload is un-changed.

Regenerative payload: radio frequency filtering, frequency transformation and amplification as well as demodulation/decoding, switching and/or routing, coding/modulation. This is effectively equivalent to having all or part of the base station functions (e.g. gNB) on a satellite (or UAS platform).

Inter-satellite links (ISL) for satellite groups. This requires a regenerative payload on the satellite. ISLs may operate at RF frequencies or optical bands.

The UE is serviced by a satellite (or UAS platform) within the target service area.

Table 6 illustrates the types of satellites (or UAS platforms).

TABLE 6

| Platform | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |

TABLE 6-continued

| Platform | Altitude range | Orbit | Typical beam footprint size |
|---|---|---|---|
| Geostationary Earth Orbit (GEO) satellite | 35 786 km | notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

Typically, GEO satellites and UAS are used to provide continental, regional or local services. And, a constellation of low earth orbiting (LEO) and medium earth orbiting (MEO) is used to provide services in both the northern and southern hemispheres. Alternatively, the corresponding constellation may provide global coverage including the polar region. In the future, appropriate orbital inclination, sufficient beams generated and inter-satellite links may be required. In addition, a highly elliptical orbiting (HEO) satellite system may be considered.

Hereinafter, a wireless communication system in NTN including the following six reference scenarios will be described.

Circular orbiting and notional station keeping platforms.
Highest RTD (Round Trip Delay) constraint
Highest Doppler constraint
A transparent and a regenerative payload
One ISL case and one without ISL case. Regenerative payload for inter-satellite links The six reference scenarios are considered in Tables 7 and 8.

TABLE 7

| | Transparent satellite | Regenerative satellite |
|---|---|---|
| GEO based non-terrestrial access network | Scenario A | Scenario B |
| LEO based non-terrestrial access network: steerable beams | Scenario C1 | Scenario D1 |
| LEO based non-terrestrial access network: the beams move with the satellite | Scenario C2 | Scenario D2 |

TABLE 8

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km<br>1,200 km |
| Spectrum (service link) | In FR1 (e.g., 2 GHz)<br>IN FR2 (e.g., DL 20 GHz, UL 30 GHz) | |
| Max channel bandwidth capability (service link) | 30 MHz in FR1<br>1 GHz in FR2 | |
| Payload | Scenario A : Transparent (including radio frequency function only)<br>Scenario B: regenerative (including all or part of RAN functions) | Scenario C: Transparent (including radio frequency function only)<br>Scenario D: Regenerative (including all or part of RAN functions) |

TABLE 8-continued

| Scenarios | GEO based non-terrestrial access network (Scenario A and B) | LEO based non-terrestrial access network (Scenario C & D) |
|---|---|---|
| Inter-Satellite link | No | Scenario C: No<br>Scenario D: Yes/No (Both cases are possible.) |
| Earth-fixed beams | Yes | Scenario C1: Yes (steerable beams), see note 1<br>Scenario C2: No (the beams move with the satellite)<br>Scenario D 1: Yes (steerable beams), see note 1<br>Scenario D 2: No (the beams move with the satellite) |
| Max beam foot print size (edge to edge) regardless of the elevation angle | 3500 km (Note 5) | 1000 km |
| Min Elevation angle for both sat-gateway and user equipment | 10° for service link and 10° for feeder link | 10° for service link and 10° for feeder link |
| Max distance between satellite and user equipment at min elevation angle | 40,581 km | 1,932 km (600 km altitude)<br>3,131 km (1,200 km altitude) |
| Max Round Trip Delay (propagation delay only) | Scenario A: 541.46 ms (service and feeder links)<br>Scenario B: 270.73 ms (service link only) | Scenario C: (transparent payload: service and feeder links)<br>25.77 ms (600km)<br>41.77 ms (1200km)<br>Scenario D: (regenerative payload: service link only)<br>12.89 ms (600km)<br>20.89 ms (1200km) |
| Max differential delay within a cell (Note 6) | 10.3 ms | 3.12 ms and 3.18 ms for respectively 600km and 1200km |
| Max Doppler shift (earth fixed user equipment) | 0.93 ppm | 24 ppm (600km)<br>21 ppm( 1200km) |
| Max Doppler shift variation (earth fixed user equipment) | 0.000 045 ppm/s | 0.27ppm/s (600km)<br>0.13ppm/s(1200km) |
| User equipment motion on the earth | 1200 km/h (e.g. aircraft) | 500 km/h (e.g. high speed train)<br>Possibly 1200 km/h (e.g. aircraft) |
| User equipment antenna types | Omnidirectional antenna (linear polarisation), assuming 0 dBi<br>Directive antenna (up to 60 cm equivalent aperture diameter in circular polarisation) | |
| User equipment Tx power | Omnidirectional antenna: UE power class 3 with up to 200 mW<br>Directive antenna: up to 20 W | |
| User equipment Noise figure | Omnidirectional antenna: 7 dB<br>Directive antenna: 1.2 dB | |
| Service link | 3GPP defined New Radio | |
| Feeder link | 3GPP or non-3GPP defined Radio interface | 3GPP or non-3GPP defined Radio interface |

NOTE 1: Each satellite may have the capability to steer beams towards fixed points on earth using beamforming techniques. This is applicable for a period of time corresponding to the visibility time of the satellite.

NOTE 2: Max delay variation within a beam (earth fixed user equipment) is calculated based on Min Elevation angle for both gateway and user equipment.

NOTE 3: Max differential delay within a beam is calculated based on Max beam foot print diameter at nadir NOTE 4: Speed of light used for delay calculation is 299792458 m/s.

NOTE 5: The Maximum beam foot print size for GEO is based on current state of the art GEO High Throughput systems, assuming either spot beams at the edge of coverage (low elevation).

NOTE 6: The maximum differential delay at the cell level is calculated by considering the delay at the beam level for the largest beam size. When the beam size is small or medium, the cell may contain more than one beam. However, the cumulative differential delay of all beams in the cell does not exceed the maximum differential delay at the cell level in Table 8.

NTN-related descriptions in this disclosure may be applied to NTN GEO scenarios and all NGSO (non-geostationary orbit) scenarios with circular orbits with an altitude of 600 km or more.

In addition, the above-described contents (NR frame structure, NTN, etc.) may be applied in combination with methods to be described later, and may be supplemented to clarify the technical characteristics of the method described in the present disclosure.

A Method for Configuring Timing Advance (TA) Value in NTN

In the TN, since the UE moves within a cell, even if the distance between the base station and the UE changes, the PRACH preamble transmitted by the UE may be transmitted to the base station within the time duration of a specific RACH occasion (RO).

In addition, the TA value for the UE to transmit an uplink signal/channel may include an initial TA value and a TA offset value. Here, the initial TA value and the TA offset value may be indicated by the base station as a TA value expressible in the cell coverage range of the base station.

As another example, when the base station indicates a PDCCH order through DCI, the UE may transmit a PRACH preamble to the base station. The UE may transmit an uplink signal/channel to the base station by using the TA value (i.e., the initial TA value) indicated through the response message (random access response, RAR) to the preamble received from the base station.

In NTN, the distance between the satellite and the UE is changed due to the movement of the satellite regardless of the movement of the UE. To overcome this, the UE may determine the location of the terminal through a global navigation satellite system (GNSS), and calculate a UE-specific TA, which is a round trip delay (RTD) between the UE and the satellite, based on orbit information of the satellite instructed by the base station.

Here, the UE-specific TA may be configured such that, when the PRACH preamble is transmitted from the RO selected by the UE, the satellite (or the base station (gNB)) may receive the PRACH preamble within the time period of the RO.

And, when only the UE-specific TA is applied when the PRACH preamble is transmitted from the RO selected by the UE, the PRACH preamble may be transmitted to the satellite (or gNB) with a delay from the reference time of the RO. In this case, the initial TA value indicated by the RAR received from the base station may indicate the delayed value.

Additionally, a common TA may mean an RTD between a gNB (or a reference point) on the ground and a satellite. Here, the reference point may mean a place where downlink and uplink frame boundaries coincide. In addition, the common TA may be defined as indicated by the base station to the UE. If the reference point is in the satellite, the common TA may not be indicated, and if the reference point is in the gNB on the ground, the common TA may be used to compensate for the RTD between the gNB and the satellite.

Additionally, in NTN, the TA value before transmission of message (message, Msg) 1 (e.g., PRACH preamble)/Msg A (e.g., PRACH preamble and PUSCH) may be configured to UE-specific TA and common TA (if provided). Here, the UE-specific TA may be an RTD between the UE and the satellite calculated by the UE itself as described above.

Figure 8A:
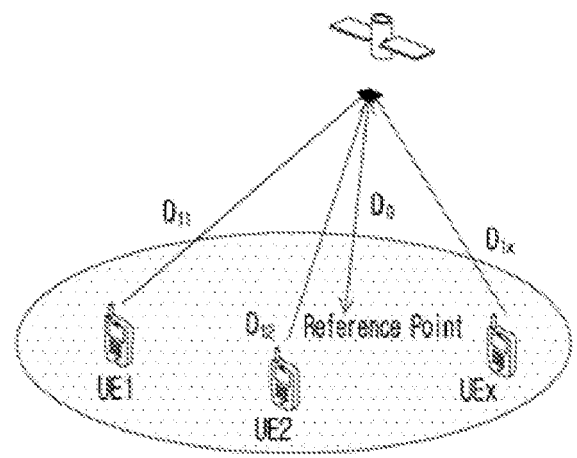
Figure 8B:
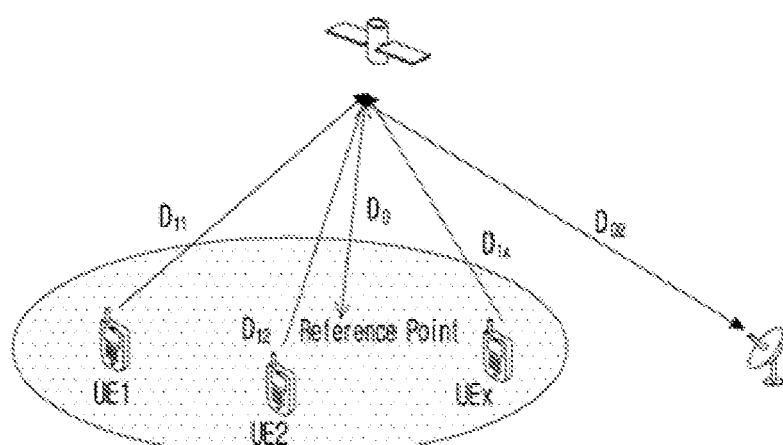

As an embodiment of the present disclosure, FIGS. 8A and 8B illustrate a method of calculating a TA value in a wireless communication system supporting NTN.

FIG. 8A illustrates a regenerative payload based NTN scenario. The common TA (Tcom) (common to all UEs) may be calculated as 2D0(distance between the satellite and the reference signal)/c, and the UE-specific differential TA (TUEx) for the x-th UE (UEx) may be calculated as 2(D1x−D0)/c. The total TA (Tfull) may be calculated as 'Tcom+TUEx'. Here, D1x may mean a distance between the satellite and UEx and c may represent the speed of light.

FIG. 8B illustrates a transparent payload based NTN scenario. The common TA (Tcom) (common to all UEs) may be calculated as 2(D01+D02)/c, and the UE-specific differential TA (TUEx) for the x-th UE (UEx) may be calculated as 2(D1x−D0)/c. The total TA (Tfull) may be calculated as 'Tcom+TUEx'. Here, D01 may mean a distance between a satellite and a reference point, and D02 may mean a distance between a satellite and a base station located on the ground.

Hereinafter, a method for the UE to obtain UE-specific TA based on satellite ephemeris information within a validity duration will be described with reference to FIG. 9.

Figure 9:
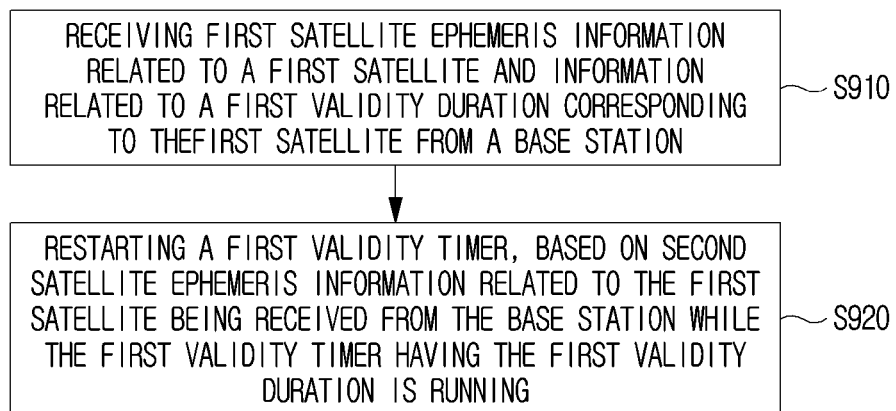
FIG. 9 is a flowchart illustrating a method of performing communication by a UE according to an embodiment of the present disclosure.

FIG. 9 is a flowchart illustrating a method of performing communication of a UE in a wireless communication system to which the present disclosure may be applied.

In describing the present disclosure, a validity duration (or a validity window) may mean a time duration between a time when a validity timer starts and a time when a validity timer expires. In addition, the wireless communication system may refer to a non-terrestrial network (NTN) system, but is not limited thereto, and may refer to various types of communication systems such as a terrestrial network (TN) system.

The UE may receive first satellite ephemeris information related to the first satellite and information related to the first validity duration corresponding to the first satellite from the base station (S910).

Here, the first satellite ephemeris information related to the first satellite and the information related to the first validity duration may be received from the base station through one signaling(e.g., higher layer signaling), but are not limited thereto, and may be received through separate signaling. In addition, the first satellite ephemeris information related to the first satellite and the information related to the first validity duration may be received together from the base station, but are not limited thereto and may be separately received from the base station.

In addition, the information related to the first validity duration may include at least one of a start/expiration time point of the first validity duration and a size of the first validity duration. As another example, the information related to the first validity duration may include information on the first validity timer having the first validity duration.

The UE may obtain the first TA (or a first UE-specific TA) for the first satellite based on the first satellite ephemeris information before restarting, expiring, or stopping after the first validity timer starts based on the first validity duration.

Figure 11A:
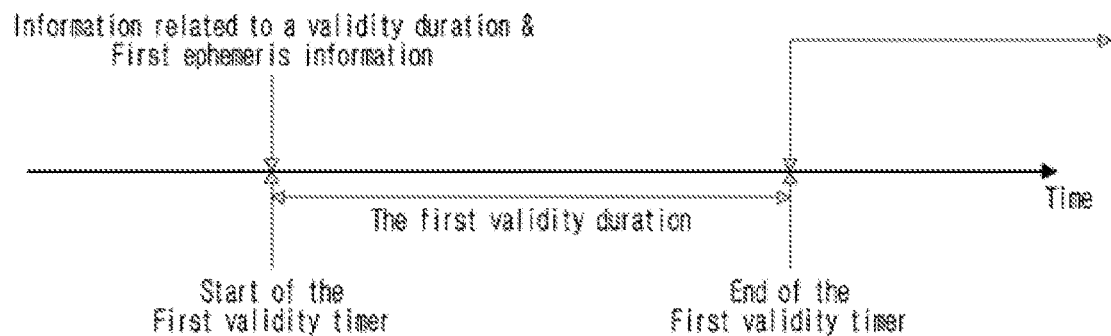
FIGS. 11A and 11B are diagrams for describing a process of obtaining a UE-specific TA in a wireless communication system to which the present disclosure may be applied.

Specifically, referring to FIG. 11A, the first (satellite) ephemeris information may be valid within the first validity duration configured by the base station (i.e., after the first validity duration starts and before it ends). That is, the UE may obtain the first TA based on the first (satellite) ephemeris information within the first validity duration. And, when the first validity duration ends (i.e., when it expires), the first (satellite) ephemeris information may no longer be valid for TA acquisition of the UE.

And, the satellite ephemeris information may be based on at least one of a first ephemeris format or a second ephemeris format.

Here, the first ephemeris format may be based on at least one of a position (or a position state vector) or a velocity (or a velocity state vector) of the satellite. And, the second ephemeris format may be based on one or more orbital elements. The one or more orbital elements may include, but are not limited to, at least one of a semi-major axis, an eccentricity, an argument of periapsis, a longitude of ascending node, an orbital inclination, or a mean anomaly.

The UE may restart the first validity timer based on receiving the second satellite ephemeris information related to the first satellite from the base station while the first validity timer having the first validity duration is running (or before the first validity timer starts and expires) (S920).

That is, the UE may restart the first validity timer having the first validity duration configured at the epoch time of assistance information (i.e., serving satellite ephemeris information).

Here, the size of the second validity duration of the restarted first validity timer may be the same as the size of the first validity duration previously configured by the base station, but is not limited thereto and may be different from each other.

The UE may obtain the second TA for the first satellite based on the second satellite ephemeris information before the first validity timer expires or stops after restarting based on the second validity duration. Here, the first TA and the second TA may mean a UE-specific TA related to the first satellite.

Figure 11B:
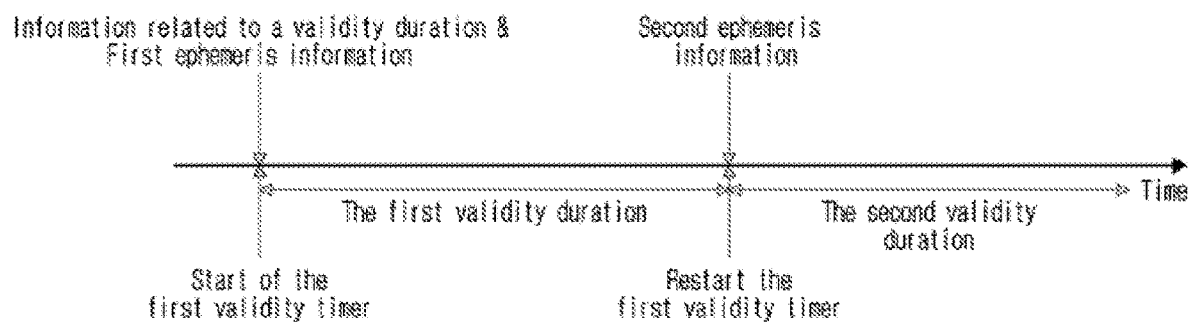

Specifically, referring to FIG. 11B, if the second (satellite) ephemeris information is received from the base station before the first validity timer expires or stops after starting based on the first validity duration, the UE may restart the first validity timer. And, after the first validity timer restarts based on the second validity duration, the UE may obtain a TA based on the second (satellite) ephemeris information.

FIG. 11B illustrates a case in which the first validity timer is restarted when the second (satellite) ephemeris information is received, but is not limited thereto. The first validity timer may be restarted at a specific time between the time when the second (satellite) ephemeris information is received and the time when the existing first validity duration ends, and the restart time of the first validity timer may be predefined.

In another embodiment, based on not receiving the second satellite ephemeris information within the first validity duration and based on the expiration of the first validity timer, the first satellite ephemeris information may no longer be valid. Accordingly, the UE may not perform the process of obtaining the TA for the first satellite based on the first satellite ephemeris information.

In an embodiment of the present disclosure, the UE may receive information related to the third validity duration corresponding to the second satellite from the base station. Here, the first satellite may be a serving satellite, and the second satellite may be a non-serving satellite (or a neighbor satellite).

A serving satellite may be expressed as a satellite for a serving cell, and a non-serving satellite (or a neighboring satellite) may be expressed as a satellite for a non-serving cell (or a satellite for a neighboring cell).

Here, the satellite ephemeris information and information related to the validity duration may be included in higher layer signaling (e.g., RRC signaling, MAC-CE, etc.) and received from the base station.

In addition, the information related to the third validity duration may include at least one of a start/expiration time point of the third validity duration and a size of the third validity duration. As another example, the information related to the third validity duration may include information on the second validity timer having the third validity duration.

In addition, the first validity timer corresponding to the first satellite and the second validity timer corresponding to the second satellite may operate independently. In addition, the validity duration of each of the first validity timer and the second validity timer may also be configured independently.

For example, the validity duration corresponding to the first satellite (e.g., the first and the second validity duration, etc.) and the validity duration corresponding to the second satellite(e.g., the third and the fourth validity duration, etc.) may be independently configured.

And, the first validity timer corresponding to the first satellite operates based on the validity duration for the satellite ephemeris information related to the first satellite, and the second validity timer corresponding to the second satellite may operate based on the validity duration for satellite ephemeris information related to the second satellite.

Based on the third satellite ephemeris information related to the second satellite being received from the base station, the UE may acquire the third TA for the second satellite based on the third satellite ephemeris information before restarting, expiring, or stopping after the second validity timer having the third validity duration starts.

Based on the fourth satellite ephemeris information related to the second satellite being received from the base station while the second validity timer is in operation, the second validity timer may be restarted by the UE.

That is, the UE may restart the second validity timer having the third validity duration configured at the epoch time of assistance information (i.e., satellite ephemeris information).

In addition, the UE may obtain the fourth TA based on the fourth satellite ephemeris information before the second validity timer expires or stops after restarting based on the fourth validity duration. Here, the third TA and the fourth TA may refer to UE-specific TAs related to the second satellite.

In this case, the sizes of the third validity duration and the fourth validity duration may be the same, but are not limited thereto and may be different from each other.

Hereinafter, a method in which a base station transmits information related to a validity duration corresponding to a satellite to a UE will be described with reference to FIG. 10.

Figure 10:
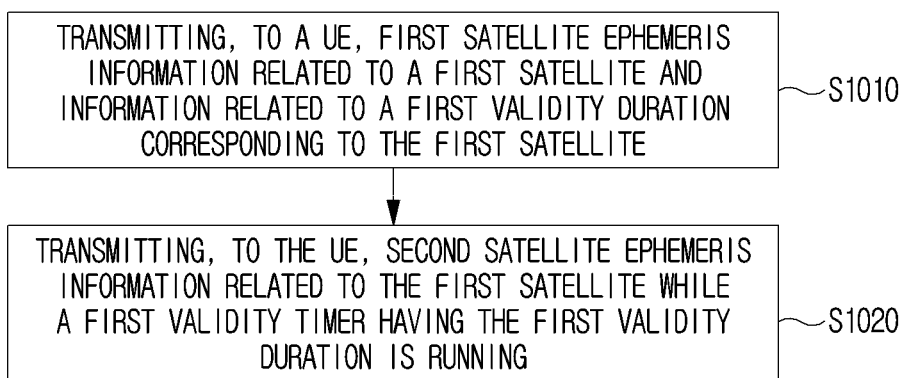
FIG. 10 is a flowchart illustrating a method of performing communication by a base station according to an embodiment of the present disclosure.

FIG. 10 is a flowchart illustrating a communication method of a base station according to an embodiment of the present disclosure.

The base station may transmit first satellite ephemeris information related to the first satellite and information related to the first validity duration corresponding to the first satellite to the UE (S1010). Since the description related to the first satellite ephemeris information and the information related to the first validity duration has been described with reference to FIG. 9, a redundant description will be omitted.

After the first validity timer configured by the base station is started based on the first validity duration and then restarted, expired, or stopped, the UE may obtain the first TA for the first satellite based on the first satellite ephemeris information.

The base station may transmit second satellite ephemeris information related to the first satellite to the UE while the first validity timer having the first validity duration is operating (S1020).

After the first validity timer is started, the UE receiving the second satellite ephemeris information may restart the first validity timer. In this case, the size of the second validity duration of the restarted first validity timer may be the same as the size of the first validity duration previously configured by the base station.

In addition, the UE may obtain the second TA for the first satellite based on the second satellite ephemeris information before the first validity timer expires or stops after restarting based on the second validity duration.

Hereinafter, a specific embodiment of the present disclosure related to an operation of acquiring a UE-specific TA based on satellite ephemeris information will be described.

The UE needs to know the satellite ephemeris (or/and, orbit) in order to calculate the UE-specific TA. Accordingly, the base station may configure/indicate the satellite ephemeris to the UE, or the UE may be configured to know the satellite ephemeris in advance (via USIM, etc.). In this case, the format of the satellite ephemeris may be implemented with the following two options.

Option 1: satellite ephemeris format based on satellite position and velocity state vectors (e.g., position and velocity vectors (x, y, z) in a reference time epoch, vx, yy, yz))

Option 2: satellite ephemeris format based on orbit element (e.g., orbit element (a, e, ω, Ω, i, M0))

The orbit state vector method, which is an example of the option 1, is a method of expressing a satellite ephemeris using six elements (a position vector and a velocity vector for each of the three directions of x, y, and z). In the above method, the orbit of the satellite may be accurately estimated only when the six elements are provided for each epoch (reference) time.

Figure 12:
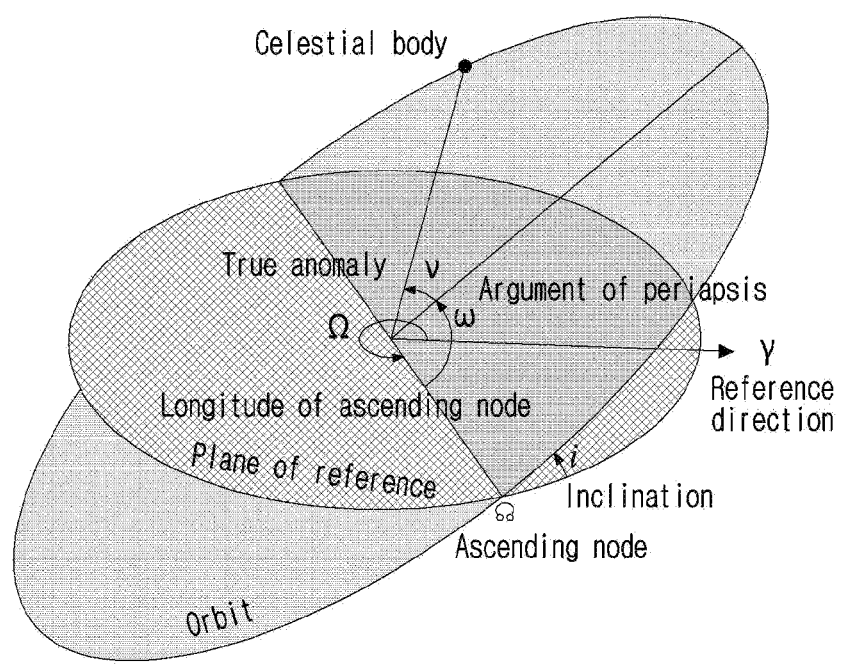
FIG. 12 is a diagram for describing one format of satellite ephemeris information according to an embodiment of the present disclosure.

As shown in FIG. 12, the Kepler orbit elements method, which is an example of option 2, is a method of expressing satellite orbits using the following six elements.

semi-major axis (half of the major axis of a satellite's orbit, which is an ellipse) "a" [m]

eccentricity "e" (in an elliptical satellite orbit, 0<e<1)

argument of periapsis (it refers to the angle from the orbital proximal point which is the point closest to the centroid when the object orbits to the ascending node, and determines the direction of the ellipse on the orbital plane.) "ω" [rad]

longitude of ascending node (the angle measured from the reference point (e.g., the reference point in the solar system is the vernal equinox) to the ascending node (i.e., the point at which the orbit passes from below the reference plane upwards) in a counterclockwise direction) "Ω" [rad]

(orbital) inclination (it refers to the degree of inclination of the ellipse with respect to the reference plane, and is measured as the angle between the raceway and the reference plane at the ascending point.) "i" [rad]

mean anomaly(it refers to an angle that changes continuously with time, which is mathematically convenient, but does not coincide with the geometric angle.) "M0"=M (t0)[rad] at epoch t0 [JD]

Here, the mean anomaly may also be expressed as a true anomaly ("v"). The true anomaly value represents the angle between the orbital periapsis and the orbiting object at any point in time, so it coincides with the geometrical angle. Accordingly, although the true anomaly is displayed in FIG. 12, the mean anomaly is not displayed.

In the Kepler orbital element method described above, the first five elements (e.g., semi-major axis (half the length of the major axis), eccentricity, argument of periapsis, longitude of ascending node, orbital inclination) are not values that change with time, assuming that there is no severe interference. Accordingly, the mean anomaly (or true anomaly) indicating the actual position of the satellite is a value to be provided for each epoch (reference) time.

In the present disclosure, a method for signaling and updating the formats indicating the two ephemeris information from the base station will be described.

A Method for Configuring Validity of Satellite Ephemeris Information

When the base station indicates all (or part of) satellite ephemeris information to the UE through a broadcast channel (e.g., SIB, RRC signaling, etc.), the UE needs to determine how long the corresponding satellite ephemeris information is valid. Accordingly, a validity window (or a validity timer) indicating the validity of the satellite ephemeris information may be configured.

Specifically, the base station may indicate/configure a duration in which the UE may use the satellite ephemeris information indicated/configured for calculation of the UE-specific TA as an validity window. For example, the size (or duration) and/or application time of the validity window may be signaled when the base station broadcasts satellite ephemeris information.

That is, when the validity window configured by the base station ends, the UE may configure to determine that the corresponding satellite ephemeris information is no longer valid. Therefore, in order for the UE to maintain valid satellite ephemeris information, the base station needs to update the satellite ephemeris information within the previously defined validity window.

When there is newly instructed/configured satellite ephemeris information, the UE may calculate a UE-specific TA by using the corresponding information, and may newly configure an validity window of the satellite ephemeris information. For example, the UE may initialize the starting point of the validity window, and the duration (or size) of the validity window may be configured to be the same as the previously indicated/configured period (or size).

And, when the base station is configured/defined to periodically broadcast all (or part of) satellite ephemeris information, the UE may expect the base station to update the satellite ephemeris information in the next period. Accordingly, at this time, the base station does not need to define a separate validity window, and the UE may determine that the immediately preceding satellite ephemeris information is always valid until the satellite ephemeris information is updated from the base station. And, since the UE completely trusts the information sent by the base station and performs various operations, the base station needs to update the satellite ephemeris information accurately and at an appropriate time.

In an embodiment of the present disclosure, when a plurality of different satellite ephemeris information formats are used, the base station may configure an independent validity timer (or validity window) for each format. Depending on the different satellite ephemeris information formats, the propagator model used may vary. Since the accuracy of the satellite ephemeris information is different for each satellite ephemeris information format, the time for maintaining the validity of the ephemeris information for each satellite ephemeris information format may be different. Therefore, it may be necessary for the base station to independently configure/indicate a validity window for each satellite ephemeris information format for efficient network operation.

For example, it may be considered that the validity timer A operates for the satellite ephemeris information format X and the validity timer B operates for the satellite ephemeris information format Y. The UE may determine the validity of each satellite ephemeris information according to whether each validity timer expires.

If all of the plurality of satellite ephemeris information formats are valid, the base station may explicitly indicate which satellite ephemeris information the UE uses to calculate the UE-specific TA, which may be defined in advance. Alternatively, a method of preferentially using satellite ephemeris information that expires first according to the remaining time of the validity timer may be considered. Alternatively, a method of preferentially using the most recently indicated satellite ephemeris information format in time may also be considered.

If a single validity timer is used even though a plurality of different satellite ephemeris information formats are used, the following UE operation may be required.

For example, in a situation where there is previously provided satellite ephemeris information format X and the validity timer A has not expired, considering the case where the base station provides the new satellite ephemeris information format Y, the UE may be configured to initialize the existing validity timer A value (i.e., to start a new validity window). Subsequently, the UE may determine that the previously provided satellite ephemeris information format X is no longer valid.

That is, from the time the new satellite ephemeris information format Y is transmitted, the UE may configure/determine that only the satellite ephemeris information format Y is valid information until the validity timer A expires.

In addition, the base station may independently configure/define the initial value (or the duration of the validity window) of the validity timer in advance according to each satellite ephemeris information format. As another example, the base station may directly indicate/configure the initial value of the validity timer to the UE through signaling such as SIB/MAC-CE/RRC or by including it in a channel through which satellite ephemeris information is transmitted.

In an embodiment of the present disclosure, in order to check whether new satellite ephemeris information is provided from the base station within a validity duration for satellite ephemeris information, the UE may be configured to monitor a downlink (DL) signal/channel (e.g., SIB, MAC-CE, RRC signaling, PDCCH) that provides satellite ephemeris information.

In this case, when new satellite ephemeris information is provided, the UE may determine that the existing satellite ephemeris information is no longer valid and calculate a UE-specific TA using the new satellite ephemeris information. In addition, when new satellite ephemeris information is provided, it may be configured that a validity duration is newly started (re-start). In this case, the base station needs to deliver new satellite ephemeris information before the validity duration ends/expires.

If new satellite ephemeris information is not provided from the base station until the validity duration ends/expires (or if the UE does not receive a DL signal/channel for delivering satellite ephemeris information), the UE determines that the existing satellite ephemeris information is no longer valid and may be configured/indicated to update the UE-specific TA value and/or stop the UE-specific TA (or full reporting).

And, the UE may be configured to monitor until new satellite ephemeris information is provided through a specific DL signal/channel (e.g., SIB, MAC-CE, RRC signaling, PDCCH, etc.). At this time, the UE is configured (BRF or RLF declaration) to enter into the idle (idle)/inactive (inactive) mode in the connected mode (connected mode), or the UE may be configured to request an update request for satellite ephemeris information to the base station.

When new satellite ephemeris information is provided from the base station after the validity duration ends/expires, the UE may be configured to update the UE-specific TA and/or report the UE-specific TA (or the entire TA) based on this value. If it enters the idle/inactive mode, the UE may be configured to re-enter the connected mode by performing an initial access procedure once more. And, when new satellite ephemeris information is provided from the base station and the UE confirms it, the validity duration may be configured to start anew.

Additionally, even if the ephemeris information of the serving (or, non-serving) satellite is updated and indicated from the base station through the DL signal/channel (e.g., SIB, MAC-CE, RRC signaling, PDCCH, etc.) before the validity duration ends/expires, the time point at which the UE updates the corresponding satellite ephemeris information may be configured as a specific time point between the time point when the DL signal/channel is received and the time point at which the existing validity duration ends. In addition, the UE may be configured to (re)start the validity timer at the corresponding point in time to update the satellite ephemeris information.

In this case, the specific time may be defined in advance. For example, the specific time point may be defined as a time point preceding (or passing) a specific offset from a time point of ending a validity duration or a time point passing (or preceding) a specific offset from a time point of receiving a DL signal/channel. Alternatively, the specific time may be indicated by the base station.

Additionally, regardless of the time when the UE actually updates the serving (or non-serving (or, upcoming)) satellite orbit, the UE may be configured to (re)start the validity duration at the time of receiving the DL signal/channel carrying the satellite ephemeris information (e.g., immediately after the last DL slot or after a specific processing time has elapsed). Alternatively, as in the previous method, it may be configured that the validity duration (re)starts according to a predefined rule or at a specific time indicated by the base station.

In an embodiment of the present disclosure, when the serving satellite is changed during the NTN service, the base station may provide the UE with satellite ephemeris information for each of the serving satellite and the non-serving satellite (or, an upcoming satellite). Characteristically, satellite ephemeris information may be provided to the UE through different DL signals/channels depending on whether the satellite is serving or non-serving. For example, the ephemeris information of the serving satellite may be transmitted through SIB, and the ephemeris information of the non-serving satellite may be configured to be transmitted through RRC signaling, MAC-CE, GC (group common)-PDCCH, etc.

Alternatively, when ephemeris information of satellites usable in connection with a specific gNB is transmitted through a specific DL signal/channel, different IDs may be assigned to each satellite. IDs that can be distinguished for each satellite may be configured to be additionally indicated through a DL signal/channel through which satellite ephemeris information is transmitted.

That is, the UE may receive the satellite ID together when the satellite ephemeris information is transmitted from the base station. Accordingly, since the satellite ID is always transmitted from the base station together with the satellite ephemeris information whether it is a serving satellite or a non-serving satellite, the UE may classify the satellite ephemeris information for each satellite ID and use the divided satellite ephemeris information when calculating/reporting the UE-specific TA for each satellite.

Characteristically, in the case of a moving cell (i.e., a system in which a cell moves according to a movement of a satellite), a method of tying a cell ID and a satellite ID may be considered.

Hereinafter, when the serving satellite is changed, a method of configuring a validity duration will be described.

In the first method, an independent validity duration for each of one or a plurality of non-serving satellites (or one for satellites) may be configured separately from the validity duration for the serving satellite. At this time, when the base station provides ephemeris information for the non-serving satellite to the UE and the UE receives it, the validity duration for the non-serving satellite may be (re)started. The UE may be configured to determine that the corresponding satellite ephemeris information is valid during the (re)started validity duration, and to calculate/report the UE-specific TA (based on the corresponding satellite ephemeris information).

In the second method, it may be configured to use one validity duration for various satellite ephemeris information that can be used in connection with a specific base station. In this case, when the base station provides ephemeris information for the non-serving satellite to the UE and the UE receives it, the validity duration may be configured to be (re)started. During the (re)started validity duration, the UE determines that the ephemeris information for the existing serving satellite is also valid as well as the ephemeris information for the non-serving satellite, and calculates/reports the UE-specific TA based on each ephemeris information.

In describing the present disclosure, the validity duration may be substituted or used interchangeably with the validity window and/or validity timer.

A Method of Updating TA Depending on Whether or not Satellite Ephemeris Information is Updated When the base station updates and indicates the UE all (or part of) satellite ephemeris information through a broadcast channel (e.g., SIB, RRC signaling, etc.), the UE-specific TA value calculated by the UE using the updated satellite ephemeris information needs to be updated.

Hereinafter, a method for the UE to update the UE-specific TA value based on the updated satellite ephemeris information will be described.

As a first method, the moment the base station updates all (or part) of the satellite ephemeris information, the UE may be instructed/configured to update the UE-specific TA. In this case, since the UE-specific TA value can be changed instantaneously as ephemeris information is changed, there is an advantage in that the UE-specific TA value may be more accurately obtained.

However, when the above-described first method is applied, the UE needs to update the UE-specific TA value even if the ephemeris information that is not significantly different from the existing ephemeris information is updated. Accordingly, the newly calculated UE-specific TA value may not be significantly different from the previously calculated UE-specific TA value.

As a second method, when the difference (or error) between the orbit (or ephemeris) estimated by the UE using the existing ephemeris information and the updated ephemeris information is greater than or equal to the threshold (e.g., when the absolute positions of the satellites along the two orbits differ by more than X m at a specific point in time), the UE may be configured to update the UE-specific TA.

When the difference between the updated ephemeris information and the existing ephemeris information is equal to or greater than a threshold, the difference in the UE-specific TA value may be significant. Accordingly, the UE may be configured to update the UE-specific TA value only when a specific condition (e.g., a difference between the updated ephemeris information and the existing ephemeris information is equal to or greater than a threshold) is satisfied.

Additionally, when the UE is in the idle/inactive mode, the base station may be configured to update all (or part of) satellite ephemeris information to the UE using a broadcast channel (e.g., SIB, etc.). And, for the UE that has entered the connected mode, the base station may be configured to update all (or part of) satellite ephemeris information using a broadcast channel (e.g., SIB, etc.) or/and UE-specific RRC signaling. And, for the UE that has entered the connected mode, the base station may be configured to update all (or part of) satellite ephemeris information through information such as group common (GC) DCI (i.e., GC-PDCCH) or MAC-CE.

In an embodiment of the present disclosure, when all of the plurality of satellite ephemeris information formats are supported, the base station may select one of the plurality of formats and provide it to the UE in the idle/inactive mode. In addition, the base station may provide another satellite ephemeris information format together with the satellite ephemeris information format (i.e. the selected satellite ephemeris information format already provided) to the UE entering the connected mode through UE-specific RRC signaling (or GC-PDCCH or MAC-CE).

At this time, the UE receiving the two satellite ephemeris information formats may be configured to use the most recently provided satellite ephemeris information or may be configured to use the first indicated satellite ephemeris information format (in terms of time) among the satellite ephemeris information formats in which the validity timer has not expired.

Operation of the UE when a Plurality of Satellite Ephemeris Information Formats are Used in the Improved NTN System Hereinafter, an operation of a UE that may be performed when a plurality of (e.g., two) formats capable of expressing satellite ephemeris information are used in the improved NTN system will be described.

In an embodiment of the present disclosure, a format representing a specific satellite ephemeris may be configured/indicated as a default format. That is, since the base station indicates/configures only a default format among formats representing a plurality of satellite orbits, signaling overhead may be reduced.

For example, a format (e.g., Kepler orbital elements (a, e, ω, Ω, i, M0)) representing a satellite ephemeris based on orbit element(s) may be configured/defined as a default format. Since some of the orbit elements for expressing the satellite ephemeris are values that do not change with time, the signaling overhead of the base station may be reduced when the above format is used.

As another example, a format for displaying a satellite ephemeris based on an orbit state vector (e.g., a position vector and a velocity vector (x, y, z, vx, vy, vz)) may be configured/indicated as a default format. Since the format may be directly used for various services such as NTN and HAPS/ATG, there may be an advantage in terms of versatility.

In addition, formats other than a default format among formats representing a plurality of satellite orbits may be configured/indicated as an optional format.

Additionally, the default format may be configured/indicated through SIB1, universal subscriber identity module (USIM), etc., and the remaining optional formats may be configured/indicated by other SIB or dedicated RRC signaling or MAC-CE.

As another embodiment of the present disclosure, the base station may configure/indicate the UE to use an appropriate format among formats representing a plurality of satellite ephemeris according to the capability of the UE.

For example, the base station may configure to use a format for displaying satellite ephemeris based on an orbit state vector for a UE supporting HAPS/ATG. The base station may be configured to use a format for displaying satellite orbits based on orbit elements for UEs that do not support HAPS/ATG.

According to the above-described embodiment, the base station may configure the UE to use an appropriate format according to the capability of the UE. However, the base station needs to transmit all of the plurality of formats.

In another embodiment of the present disclosure, a base station or a UE may configure/indicate a priority according to a satellite ephemeris information format.

For example, (according to the capability or service environment of the UE) the UE configures a priority in the satellite ephemeris information format and may be configured to use the highest priority format among the satellite ephemeris information formats indicated/configured (by the base station).

As another example, the base station configures a priority for the satellite ephemeris information format and informs the UE of it, and the UE may be configured to use the high priority format accordingly.

As another embodiment of the present disclosure, a method of combining a plurality of satellite ephemeris information may be configured/indicated for the UE.

For example, the base station configures/indicates the ephemeris information format based on the orbit element to the UE once in a long period, and the base station may be configured to configure/indicate the ephemeris information format based on the orbit state vector to the UE in a short period.

The UE may more accurately estimate the satellite ephemeris (or orbit) by combining the plurality of satellite ephemeris information.

For example, the UE may predict the entire ephemeris and the current satellite position using ephemeris information based on orbit elements, and may check the difference (or error) by comparing the predicted result and the ephemeris information based on the orbit state vector.

As another example, the UE may be configured to use the average or intermediate value of the positions of the satellites obtained according to satellite ephemeris information based on two methods (i.e., a method based on an orbit element and an orbit state vector).

As another embodiment of the present disclosure, it may be defined as differently configuring a TA margin and/or a K offset margin for each format representing a specific satellite ephemeris (or orbit). Accuracy for estimating a satellite position may be different when calculating a UE-specific TA value according to a format representing a satellite ephemeris. Accordingly, the TA margin and/or K offset applied for each format representing the satellite ephemeris may be configured differently.

As another embodiment of the present disclosure, the base station may be configured to indicate that a format used for a serving satellite and a format used for an upcoming satellite are the same format. That is, it may be expected that the UE confirms the satellite ephemeris information received through the serving satellite, and that the satellite ephemeris information for the upcoming satellite is transmitted in the same format as previously indicated for the serving satellite.

Hereinafter, a method of signaling and updating satellite ephemeris information will be described.

In an embodiment of the present disclosure, a format for displaying satellite ephemeris based on orbital elements may be used.

For example, when only one satellite ephemeris is used for NTN service, all six element information may be initially stored and provided/indicated in USIM once or broadcast through SIB1.

The base station may be configured to provide/indicate the mean anomaly (or true anomaly) indicating the actual position of the satellite for each epoch (reference) time. Specifically, the base station may be configured to update the mean anomaly value for the existing serving satellite for each epoch (reference) time, and to additionally inform the mean anomaly value for the upcoming satellite for each epoch (reference) time. In this case, the base station may distinguish and configure whether the parameter is a value for a serving satellite or a value for an upcoming satellite.

As another example, it is assumed that a plurality of different satellite ephemeris are used for the NTN service.

In this case, six pieces of information about each of the pieces of ephemeris information may be stored in the USIM. For each of the satellites, it is necessary to indicate which ephemeris among the orbit ephemeris stored in the USIM through broadcast information. The base station may indicate one of indices corresponding to different trajectories through a broadcast channel (e.g., SIB1, etc.).

In addition, the base station may update the mean anomaly (or true anomaly) value for the existing serving satellite for each epoch (reference) time, and may additionally inform the UE of the mean anomaly (or true anomaly) value for the upcoming satellite for each epoch (reference) time. In this case, the base station may distinguish whether the parameter is a value for a serving satellite or a value for an upcoming satellite.

As another example, six elements of information about a serving satellite may be provided during an initial access procedure performed for the first time. Thereafter, the base station updates the mean anomaly (or true anomaly) value for the serving satellite for each epoch (reference) time, and when an upcoming satellite appears, 6 element information about the upcoming satellite may be separately provided. In addition, the base station may update the mean anomaly (or true anomaly) value for the upcoming satellite for each epoch (reference) time.

The base station may indicate the size of a specific field(s) of another SIB (e.g., SIB_NTN) in SIB1, and actual satellite ephemeris information may be broadcast through SIB_NTN. In this case, the base station may broadcast satellite ephemeris information using not only another SIB (e.g., SIB_NTN) but also dedicated RRC signaling or MAC-CE.

The base station may be configured to inform an mean anomaly (or true anomaly), which is a parameter value that changes with time, based on the time served for each country.

And, when the satellite ephemeris information does not change significantly, the numerical values of the first 5 elements (half the length of the major axis, eccentricity, argument of periapsis, longitude of ascending node, orbit inclination, etc.) among the six orbital elements generally do not change significantly. Accordingly, when the satellite ephemeris information is greatly changed or a predefined update period has elapsed, the first five elements may be configured to be updated.

In another embodiment of the present disclosure, a format for displaying satellite ephemeris based on an orbit state vector may be used.

For example, it is assumed that only one same satellite ephemeris is used for NTN service.

Based on the serving time for each country, all of the six element information may be initially stored and indicated/configured in the USIM or may be indicated/configured by broadcasting through SIB1. If necessary, while updating each element related to the existing serving satellite, the base station may additionally inform the UE of the element value of each of the upcoming satellites. In this case, the base station may distinguish whether the parameter is a value for a serving satellite or a value for an upcoming satellite.

As another example, it is assumed that a plurality of different satellite ephemeris are used for the NTN service.

For example, six elements of information for each of a plurality of ephemeris information may be stored in the USIM for a serving time for each country. The base station may indicate which orbit the satellite follows from among orbit information stored in the USIM for each satellite through broadcast information.

For example, the base station may indicate one of indices corresponding to different trajectories through a broadcast channel. And, if necessary, the base station may update each element for the serving satellite and additionally inform the value of each element for the upcoming satellite. In this case, the base station may distinguish whether the parameter is a value for a serving satellite or a value for an upcoming satellite.

As another example, in an initial access procedure performed for the first time, all six pieces of information about a serving satellite may be provided for a specific time (e.g., 1/20 of the serving time for each country considering the overhead). Each parameter for the upcoming satellite may then be updated. Specifically, the position vector indicated by the first three of the six elements may be updated with a long period, and the velocity vector indicated by the remaining three elements may be updated with a short period. In this case, the UE may estimate the position of the satellite using the velocity vector updated in a short period.

Examples of the above-described embodiment may be included as one of the implementation methods of the present disclosure. In addition, the above-described embodiments may be implemented independently, but may also be implemented in the form of a combination (or combination) of some embodiments.

A rule may be defined so that the base station informs the UE of whether the above embodiments are applicable (or informs information about the rules of the above embodiments) through a predefined signal (e.g., a physical layer signal or a higher layer signal). The higher layer may include, for example, one or more of functional layers such as MAC, RLC, PDCP, RRC, and SDAP.

Methods or descriptions for implementing the embodiments described in the present disclosure may be applied separately or one or more methods (or embodiments or descriptions) may be applied in combination. Also, the embodiments described in the present disclosure may be applied to a technique for estimating an accurate location of a UE.

Figure 13:
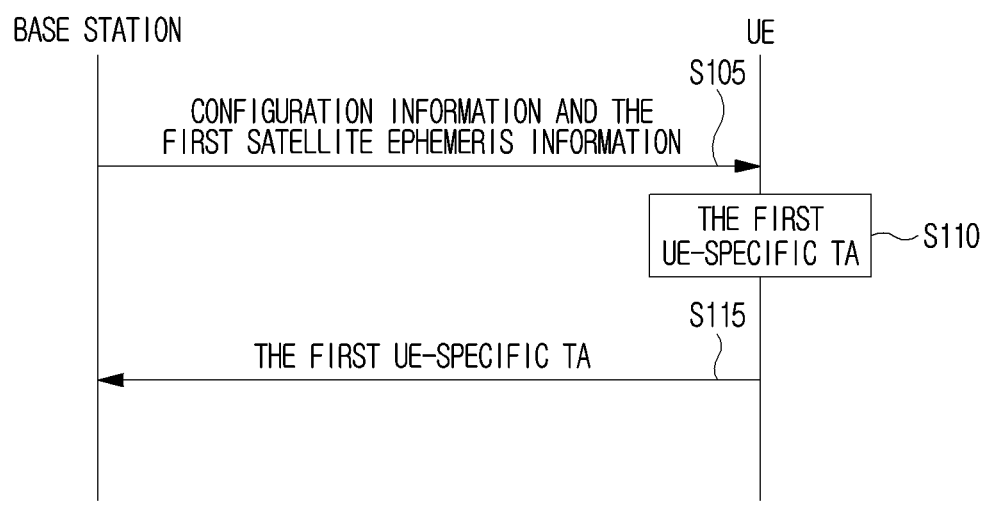
FIG. 13 is a sequence diagram illustrating a signaling procedure between a UE and a network according to an embodiment of the present disclosure.

FIG. 13 is a diagram for describing a signaling procedure according to an embodiment of the present disclosure.

FIG. 13 shows an example of signaling between a network side and a terminal (UE) in a situation in which one or more physical channels/signals are transmitted NTN to which embodiments of the present disclosure (e.g., each embodiment or a combination of one or more of its detailed examples) described above can be applied.

Figure 14:
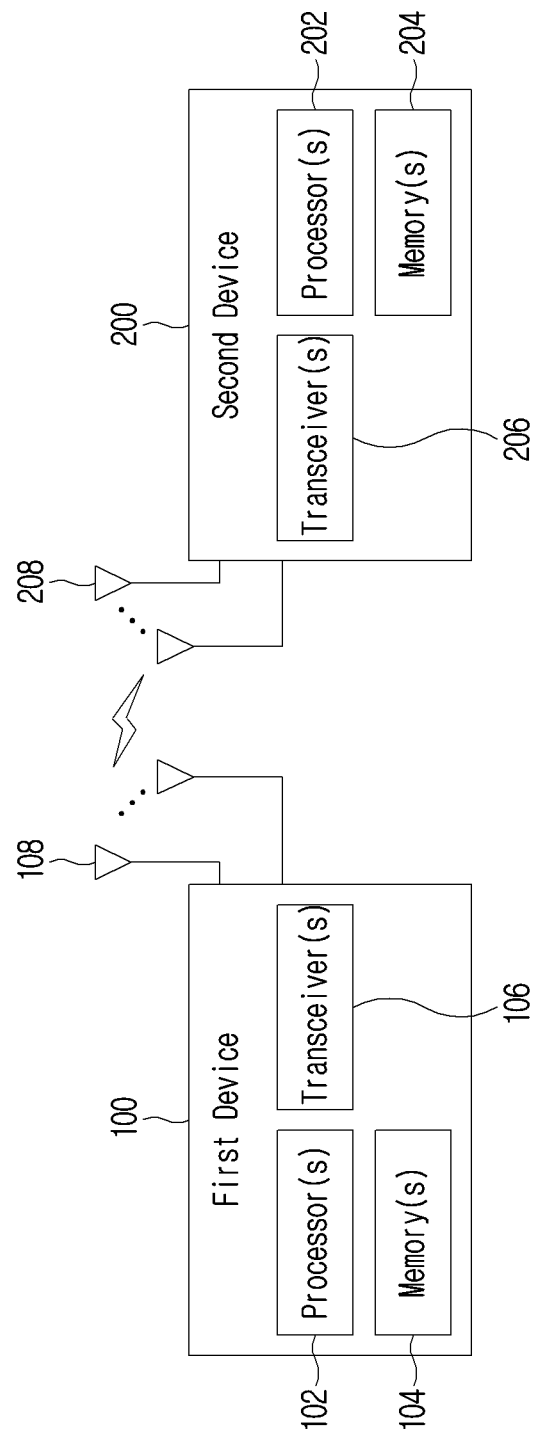
FIG. 14 illustrates a block diagram of a wireless communication device according to an embodiment of the present disclosure.

Here, UE/Network side may be an example and may be applied by being substituted with a variety of devices as described in FIG. 14. FIG. 13 is only for convenience of description, but it is not intended to limit a scope of the present disclosure. In addition, some step(s) shown in FIG. 13 may be omitted according to a situation and/or a configuration, etc. In addition, in the operation of the network side/UE of FIG. 13, the above-described random access procedure operation and the like may be referred to or used.

In the following description, a Network side may be one base station including a plurality of TRPs or may be one cell including a plurality of TRPs. Alternatively, the network side may include a plurality of remote radio heads (RRHs)/remote radio units (RRUs). In an example, ideal/non-ideal backhaul may be configured between TRP 1 and TRP 2 included in a Network side. In addition, the following description is described based on a plurality of TRPs, but it may be equally extended and applied to transmission through a plurality of panels/cells, and may also be extended and applied to transmission through a plurality of RRHs/RRUs.

In addition, although described based on "TRP" in the following description, as described above, "TRP" may be replaced with expressions of a panel, an antenna array, a cell (e.g., a macro cell/small cell/pico cell, etc.), a TP (transmission point), a base station (e.g., gNB, etc.), and the like. As described above, the TRP may be classified according to information (e.g., CORESET index, ID) on the CORESET group (or CORESET pool). As an example, when one UE is configured to perform transmission/reception with a plurality of TRPs (or cells), this may mean that a plurality of CORESET groups (or CORESET pools) are configured for one UE. The configuration of such a CORESET group (or CORESET pool) may be performed through higher layer signaling (e.g., RRC signaling, etc.).

In addition, the base station may mean a generic term for an object that transmits and receives data with the UE. For example, the base station may be a concept including one or more TPs (Transmission Points), one or more TRPs (Transmission and Reception Points), and the like. In addition, the TP and/or TRP may include a panel of a base station, a transmission and reception unit, and the like.

The UE may receive configuration information and first satellite ephemeris information from the base station (S105).

For example, the configuration information may include NTN-related configuration information/configuration information for uplink transmission (e.g., PUCCH-config/PUSCH-config)/reception/HARQ process-related configuration (e.g., HARQ feedback enable/disable/number of HARQ processes, etc.)/CSI report-related configuration (e.g., CSI report configuration/CSI report quantity/CSI-RS resource configuration, etc.) described in the above-described embodiment (e.g., each embodiment or a combination of one or more of its detailed examples).

As another example, the configuration information may include information related to a first validity duration corresponding to a first satellite and/or information related to a second validity duration corresponding to a second satellite.

For example, the configuration information may be transmitted through higher layer (e.g., RRC or MAC CE) signaling. In addition, the first satellite ephemeris information may be transmitted while being included in the configuration information, but is not limited thereto, and may be transmitted while being included in a separate higher layer signaling.

And, the first satellite ephemeris information may be implemented in a first ephemeris format based on the position and velocity state vector of the satellite or/and a second ephemeris format based on one or more orbit elements.

For example, the operation of the UE (100 or 100 in FIG. 14) receiving the configuration information and the first satellite ephemeris information from the base station (200 or 100 in FIG. 14) in step S105 described above may be implemented by the apparatus of FIG. 14 to be described below. For example, referring to FIG. 14, one or more processors 102 may control one or more transceivers 106 and/or one or more memories 104 to receive the configuration information, and the like, and one or more transceivers 106 may receive the configuration information from the network side.

The UE may obtain the first UE-specific TA based on the first satellite ephemeris information (S110). For example, the UE may obtain the first UE-specific TA by using the first satellite ephemeris information before the first validity timer having the first validity duration configured by the base station expires based on the above-described embodiment (e.g., each embodiment or a combination of one or more of its detailed examples), etc. When the first validity timer expires, the first satellite ephemeris information may no longer be valid.

For example, the operation of the UE (100 or 200 in FIG. 14) obtaining the first UE-specific TA in step S110 described above may be implemented by the apparatus of FIG. 14 below. For example, referring to FIG. 14, the one or more processors 102 may control the one or more memories 104 and the like to obtain the first UE-specific TA.

The UE may transmit the first UE-specific TA to the base station (S115). For example, the UE may report to the base station the first UE-specific TA obtained based on the above-described embodiments (e.g., a combination of one or more of each embodiment or detailed examples thereof).

For example, the operation of the UE (100 or 200 in FIG. 14) transmitting the first UE-specific TA in step S115 described above may be implemented by the apparatus of FIG. 14 below. For example, referring to FIG. 14, one or more processors 102 may control one or more memories 104 and the like to transmit the uplink data/channel.

As mentioned above, the above-described signaling and embodiments of the base station/UE (e.g., each embodiment or a combination of one or more of detailed examples thereof) may be implemented by the apparatus to be described with reference to FIG. 14. For example, the base station may correspond to the first device 100 and the UE may correspond to the second device 200, and vice versa may be considered in some cases.

For example, the above-described signaling and operation of the base station/UE (e.g., each embodiment or a combination of one or more of its detailed examples) may be processed by one or more processors (e.g., 102, 202) of FIG. 14, and the above-described signaling and operation of the base station/UE (e.g., each embodiment or a combination of one or more of its detailed examples) may be stored in the memory (e.g., 104, 204) in the form of instructions/programs (e.g. instruction, executable code) for driving at least one processor (e.g., 102, 202) of FIG. 14.

General Device to which the Present Disclosure May be Applied

FIG. 14 illustrates a block diagram of a wireless communication apparatus according to an embodiment of the present disclosure.

Referring to FIG. 14, the first device 100 and the second device 200 may transmit/receive radio signals through various radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs(Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN(Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat S1, 3) LTE Cat M2, 4) LTE non-BL(non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN(personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method performed by a user equipment (UE), the method comprising:
receiving, from a base station, a system information block (SIB) including first configuration information related to non-terrestrial network (NTN) access, wherein the first configuration information including first satellite ephemeris information related to a first satellite, information related to a first validity duration during which the UE can apply the first satellite ephemeris information for a first validity timer and information related to an epoch time related to the first satellite ephemeris information; and
starting or restarting the first validity timer with a timer value set to the first validity duration from the epoch time related to the first satellite ephemeris information,
wherein the UE obtains a first timing advance (TA) for the first satellite based on the first satellite ephemeris information before receiving another satellite ephemeris information, and
wherein the SIB includes second configuration information related to NTN access for at least one neighbor cell.

2. The method of claim 1, wherein:
at least one of the first or another satellite ephemeris information is based on at least one of a first ephemeris format or a second ephemeris format,
the first ephemeris format is based on at least one of a position state vector or a velocity state vector of a satellite, and
the second ephemeris format is based on at least one orbit element.

3. The method of claim 1, wherein:
based on the another satellite ephemeris information being not received within the first validity duration and based on expiration of the first validity timer, the first satellite ephemeris information is no longer valid for TA obtainment of the UE.

4. The method of claim 1, wherein:
at least one neighbor satellite related to the at least one neighbor cell is a non-serving satellite, and
the second configuration information including information related to a third validity duration related to the at least one neighbor satellite is received from the base station.

5. The method of claim 4, wherein:
based on third satellite ephemeris information related to the at least one neighbor satellite being received, a third TA for the at least one neighbor satellite is obtained based on the third satellite ephemeris information before a second validity timer with a timer value set to the third validity duration restarts, expires, or stops after starting.

6. The method of claim 5, wherein:
the first validity timer related to the first satellite and the second validity timer related to the at least one neighbor satellite run independently.

7. The method of claim 5, wherein:
a validity duration related to the first satellite and a validity duration related to the at least one neighbor satellite are independently configured.

8. The method of claim 5, wherein:
the first validity timer related to the first satellite runs based on a validity duration for satellite ephemeris information related to the first satellite, and
the second validity timer related to the at least one neighbor satellite runs based on a validity duration for satellite ephemeris information related to the at least one neighbor satellite.

9. The method of claim 5, wherein:
based on fourth satellite ephemeris information related to the at least one neighbor satellite being received from the base station while the second validity timer is running, the second validity timer is restarted by the UE.

10. The method of claim 9, wherein:
a fourth TA is obtained based on the fourth satellite ephemeris information before the second validity timer expires or stops after restarting based on a fourth validity duration.

11. The method of claim 1, wherein:
the UE is in a wireless communication system which is a NTN system.

12. A user equipment (UE) configured to operate in a wireless communication system, the UE comprising:
at least one transceiver; and
at least one processor connected to the at least one transceiver,
wherein the processor is configured to:
receive, through the at least one transceiver from a base station, a system information block (SIB) including first configuration information related to non-terrestrial network (NTN) access, wherein the first configuration information including first satellite ephemeris information related to a first satellite, information related to a first validity duration during which the UE can apply the first satellite ephemeris information for a first validity timer and information related to an epoch time related to the first satellite ephemeris information; and
start or restart the first validity timer with a timer value set to the first validity duration from the epoch time related to the first satellite ephemeris information,
wherein the UE obtains a first timing advance (TA) for the first satellite based on the first satellite ephemeris information before receiving another satellite ephemeris information, and
wherein the SIB includes second configuration information related to NTN access for at least one neighbor cell.

13. A processing device configured to control a user equipment (UE), the processing device comprising:
at least one processor; and
at least one computer memory operatively coupled to the at least one processor and storing instructions for performing operations upon being executed by the at least one processor,
wherein the operations comprise:
receiving, from a base station, a system information block (SIB) including first configuration information related to non-terrestrial network (NTN) access, wherein the first configuration information including first satellite ephemeris information related to a first satellite information related to a first validity duration during which the UE can apply the first satellite ephemeris information for a first validity timer and information related to an epoch time related to the first satellite ephemeris information; and
starting or restarting the first validity timer with a timer value set to the first validity duration from the epoch time related to the first satellite ephemeris information,
wherein the UE obtains a first timing advance (TA) for the first satellite based on the first satellite ephemeris information before receiving another satellite ephemeris information, and
wherein the SIB includes second configuration information related to NTN access for at least one neighbor cell.

14. At least one non-transitory computer readable medium storing at least one instruction, wherein:
the at least one instruction executed by at least one processor controls a user equipment (UE) to perform:
receiving, from a base station, a system information block (SIB) including first configuration information related to non-terrestrial network (NTN) access, wherein the first configuration information including first satellite ephemeris information related to a first satellite information related to a first validity duration during which the UE can apply the first satellite ephemeris information for a first validity timer and information related to an epoch time related to the first satellite ephemeris information; and
starting or restarting the first validity timer with a timer value set to the first validity duration from the epoch time related to the first satellite ephemeris information,
wherein the UE obtains a first timing advance (TA) for the first satellite based on the first satellite ephemeris information before receiving another satellite ephemeris information, and
wherein the SIB includes second configuration information related to NTN access for at least one neighbor cell.

* * * * *